United States Patent [19]
Alciati

[11] Patent Number: 4,572,490
[45] Date of Patent: Feb. 25, 1986

[54] SHOCK ABSORBING SUPPORT

[75] Inventor: Fiorenzo Alciati, Asti, Italy

[73] Assignee: Societa' Impianti Elettrici Telefonici Telegrafici e. Costruzioni Edili S.p.A., Florence, Italy

[21] Appl. No.: 589,637

[22] Filed: Mar. 14, 1984

[30] Foreign Application Priority Data

Mar. 15, 1983 [IT] Italy ............................. 67289 A/83

[51] Int. Cl.[4] .......................................... F16F 9/08
[52] U.S. Cl. ................................ 267/140.1; 267/35
[58] Field of Search ............... 248/562, 631, 632, 634, 248/638; 267/8 R, 35, 122, 140.1

[56] References Cited

U.S. PATENT DOCUMENTS

| 4,352,487 | 10/1982 | Shtarkman | 267/35 |
| 4,420,060 | 12/1983 | Kakimoto | 267/140.1 X |

FOREIGN PATENT DOCUMENTS

| 3140783 | 4/1983 | Fed. Rep. of Germany | 267/140.1 |
| 2500555 | 8/1982 | France | 267/140.1 |
| 2041488 | 10/1980 | United Kingdom | 267/140.1 |
| 580384 | 11/1977 | U.S.S.R. | 267/140.1 |

Primary Examiner—Duane A. Reger
Attorney, Agent, or Firm—James B. Raden; William J. Michals

[57] ABSTRACT

A shock-absorbing resilient support for the suspension of a body on a support structure, particularly for the suspension of motor vehicle engines, motor lorry cabs and the like, comprises a chamber having a variable volume, which is filled with gas under pressure and serves to support at least part of the weight of the suspended body. The support further comprises two variable volume chambers filled with a viscous fluid and separated by a dividing wall provided with at least one passage for the transfer of viscous fluid from one chamber to the other upon displacement of the suspended body with respect to the support structure. Valve means are provided to vary the overall flow cross-section which puts the two chambers filled with the viscous fluid into communication with one another in the event of low frequency, high amplitude displacements of the suspended body with respect to the support structure. In one particular embodiment, the damping effect can be different according to whether the suspended body is displaced upwards or downwards.

11 Claims, 5 Drawing Figures

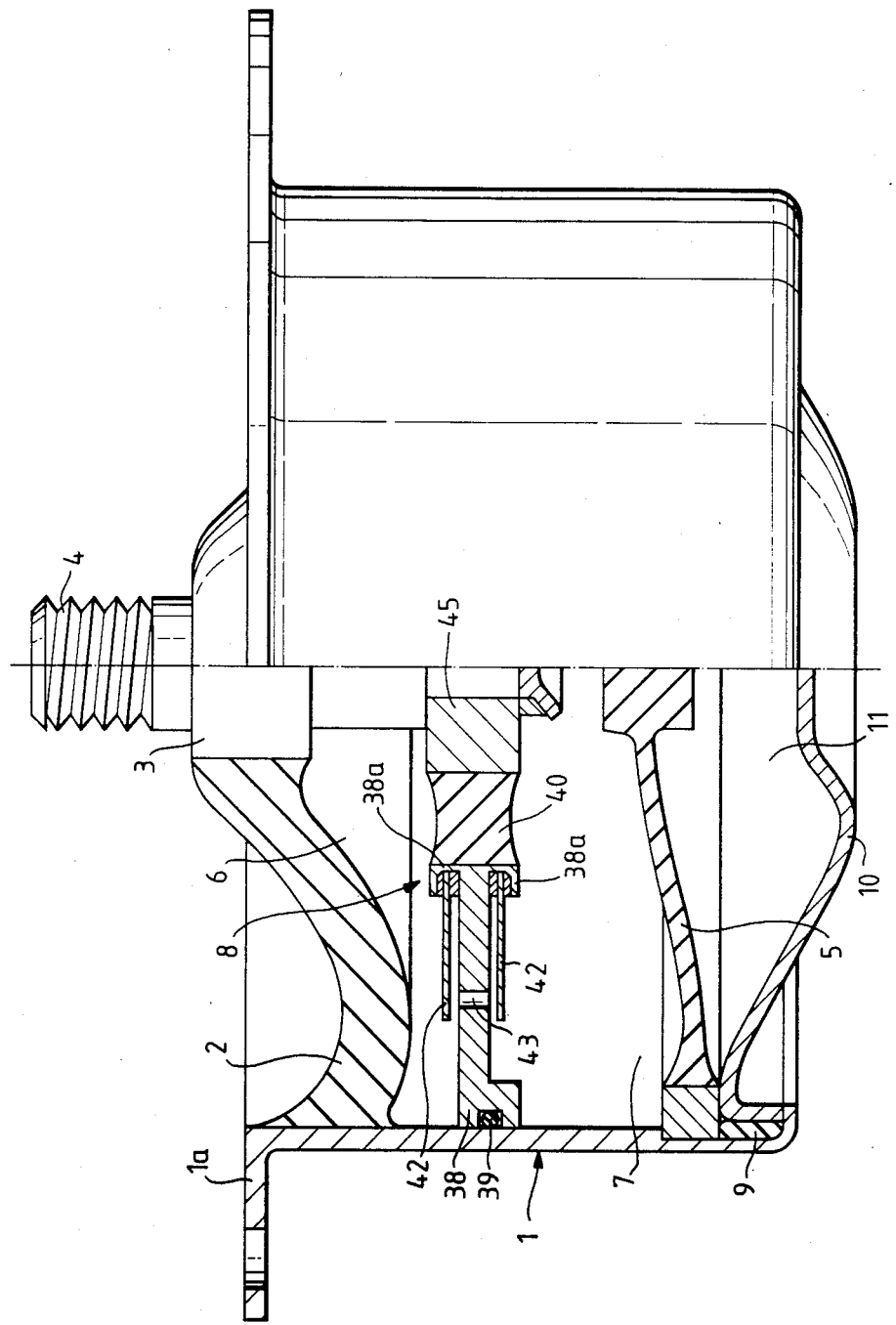

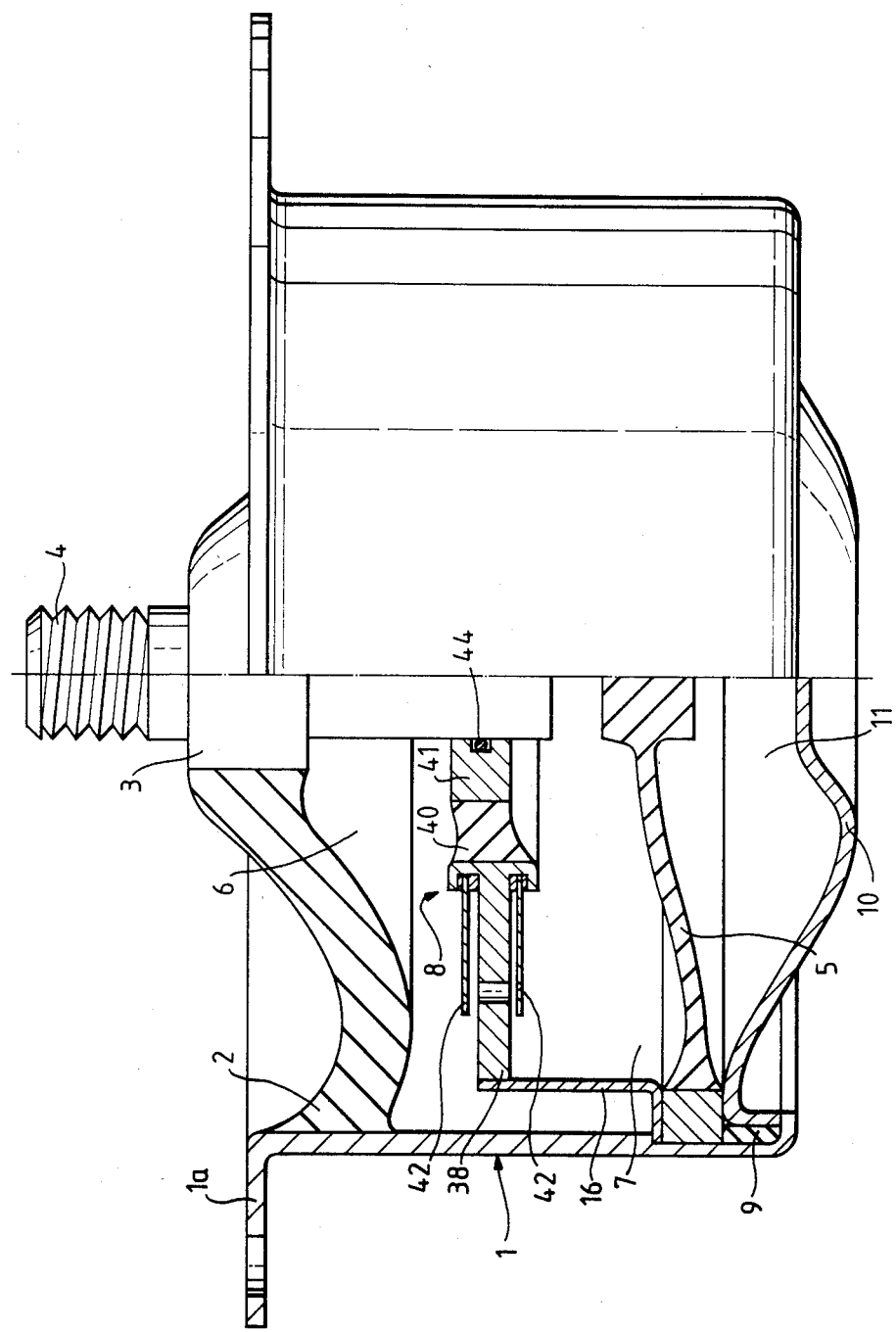

SHOCK ABSORBING SUPPORT

BACKGROUND OF THE INVENTION

The present invention relates to shock-absorbing resilient supports for the suspension of a body on a support structure, particularly for the suspension of motor vehicle engines, motor lorry cabs, and the like.

In particular, the invention relates to a shock-absorbing resilient support of known type comprising:
- a first metal attachment element intended to be fixed to the support structure;
- a second metal attachment element intended to be fixed to the body to be suspended on the support structure;
- a flexible body of elastomeric material which connects the said two metal elements together;
- a resilient membrane carried by the said first attachment element, which delimits, together with the body of elastomeric material, a closed cavity filled with a viscous fluid, and
- a dividing wall within the said closed cavity which separates this cavity into first and second variable volume chambers, this dividing wall being provided with at least one passage for the transfer of the viscous fluid from one chamber to the other upon relative displacements between the first and the second attachment elements.

The object of the present invention is to provide a resilient support of the above specified type which will have a relatively simple, economic and reliable structure, and which at the same time allows effective limitation of the low frequency, large amplitude oscillations of the suspended body with respect to the support structure.

SUMMARY OF THE INVENTION

With a view to achieving this object, the subject of the present invention is a resilient support of the known type described above, principally characterized by the combination of the following characteristics:
(a) the said resilient membrane delimits-on the side opposite the said cavity filled with viscous fluid-a third variable volume chamber filled with gas under pressure and serving to support, at least in part, the weight of the suspended body, and
(b) valve means are provided for varying the overall flow cross-section which puts the first and the second chamber into communication with one another in the event of low frequency, large amplitude relative displacements between the first and second attachment elements.

In one embodiment, the said valve means are operable to reduce the overall flow cross-section which puts the first and second chambers into communication with one another, when the said relative displacements of low frequency and large amplitude occur. In this way, there is obtained a limiting action for such displacements, which does not happen with small amplitude displacements.

In another embodiment, the said valve means are operable to provide different damping actions according to whether the suspended body is displaced upwards or downwards with respect to the support structure.

Further characteristics and advantages of the present invention will become apparent from the description which follows with reference to the attached drawings, provided purely by way of non-limitative example, in which:

BRIEF DESCRIPTION OF THE DRAWING

FIGS. 1 to 5 illustrate, partially in section, five different embodiments of the shock-absorbing resilient support according to the present invention.

DETAILED DESCRIPTION

Figure 1:
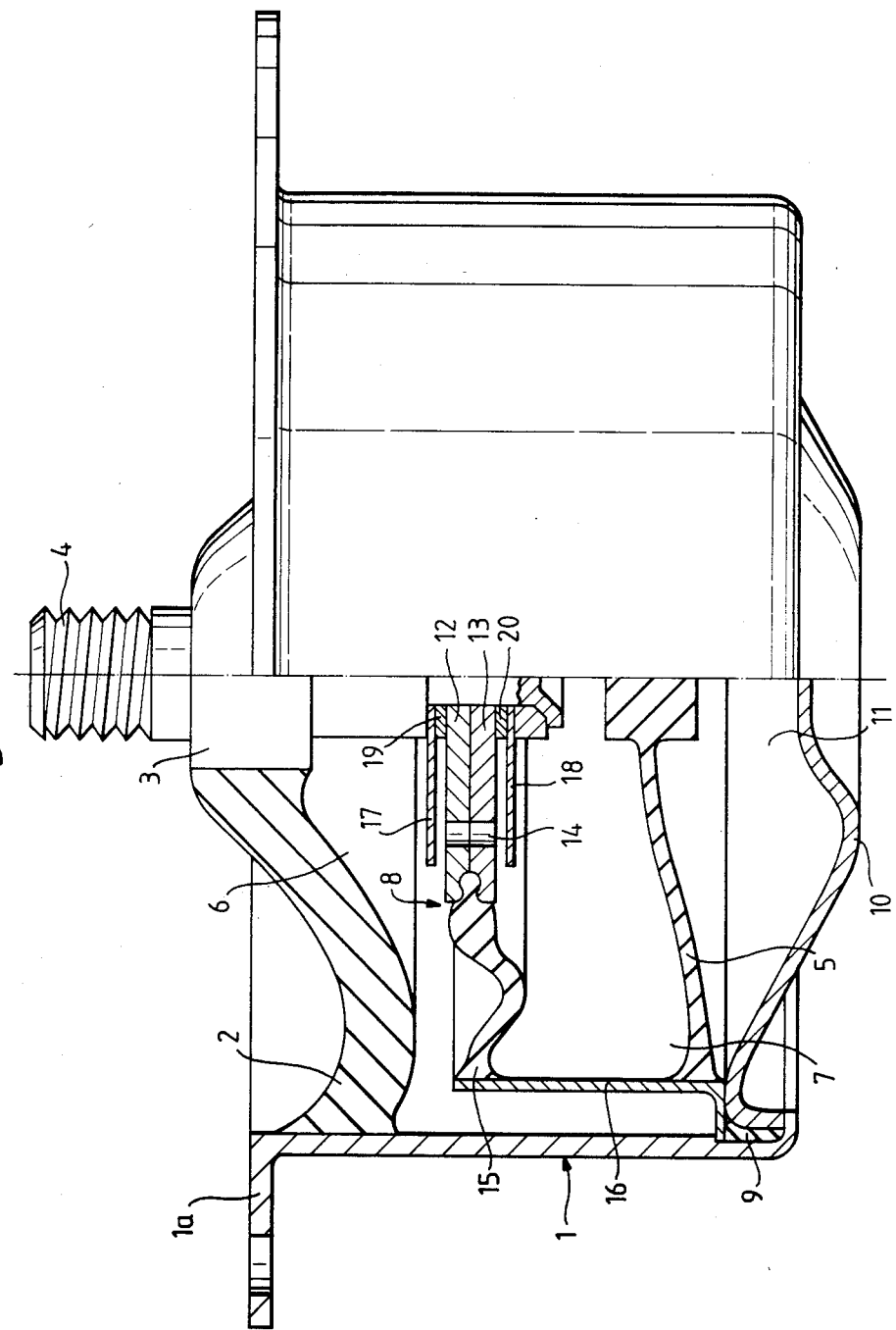

FIG. 1 illustrates a shock-absorbing resilient support for motor vehicle engines, comprising a first metal attachment element 1 intended to be fixed to the engine support frame. The first metal attachment element 1 is in the form of a cylindrical casing having a flange 1a at one end, formed by stamping (as in the case illustrated) or welding, for attachment to the engine support frame. The element 1 is connected, by means of a deformable annular element 2 of elastomeric material, to a second metal attachment element 3 intended to be fixed to the motor vehicle engine. The element 3 is provided with a threaded fixing spigot 4 (as in the case illustrated) or else with a threaded hole intended to be engaged by a corresponding spigot carried by the engine.

The reference numeral 5 indicates a resilient membrane of elastomeric material which delimits, together with the elements 1, 2, a cavity filled with a viscous fluid which is divided into first and second variable volume chambers 6, 7 by a partition generally indicated 8. A cover 10 is fixed to the first metal attachment element 1 with the interposition of a seal 9; the cover 10 delimits, together with the resilient membrane 5, a third variable volume chamber 11 filled with a gas under pressure which serves to support at least part of the weight of the motor vehicle engine.

The dividing wall or partition 8 comprises two metal discs 12, 13 joined together in such a way as to define a single annular element fixed centrally to the metal element 3 and provided with one or more calibrated holes 14 which allow the passage of the viscous fluid between the two chambers 6, 7 upon displacements of the engine with respect to its supporting chassis. The peripheral edge of the annular element constituted by the two metal discs 12, 13 is connected, by means of a deformable membrane 15 of elastomeric material, to a tubular metal armature 16 which is disposed within the cavity filled with viscous fluid and which is fixed at one end to the metal attachment element 1. The peripheral edge of the flexible membrane 5 is also fixed to the tubular metal armature 16.

The reference numerals 17, 18 indicate two resilient metal discs disposed parallel and adjacent the two opposite faces of the two metal discs 12, 13 and centrally fixed to the metal attachment element 3. Two rings 19, 20 normally maintain the resilient discs 17, 18 spaced from the metal discs 12, 13.

During displacements of the engine at high frequency and a small amplitude with respect to its supporting chassis, a damping action is obtained by the transfer of viscous fluid (oil) through the calibrated holes 14. When displacements of low frequency and large amplitude occur, the peripheral zone of one of the two resilient discs 17, 18 is carried close to the corresponding end of the hole 14 thereby obstructing it and impeding the passage of oil through the holes. In this way, a limiting action on the said large amplitude displacements is obtained. The function of the chamber 11 filled with gas under pressure is to support, at least in part, the weight of the engine.

Figure 2:
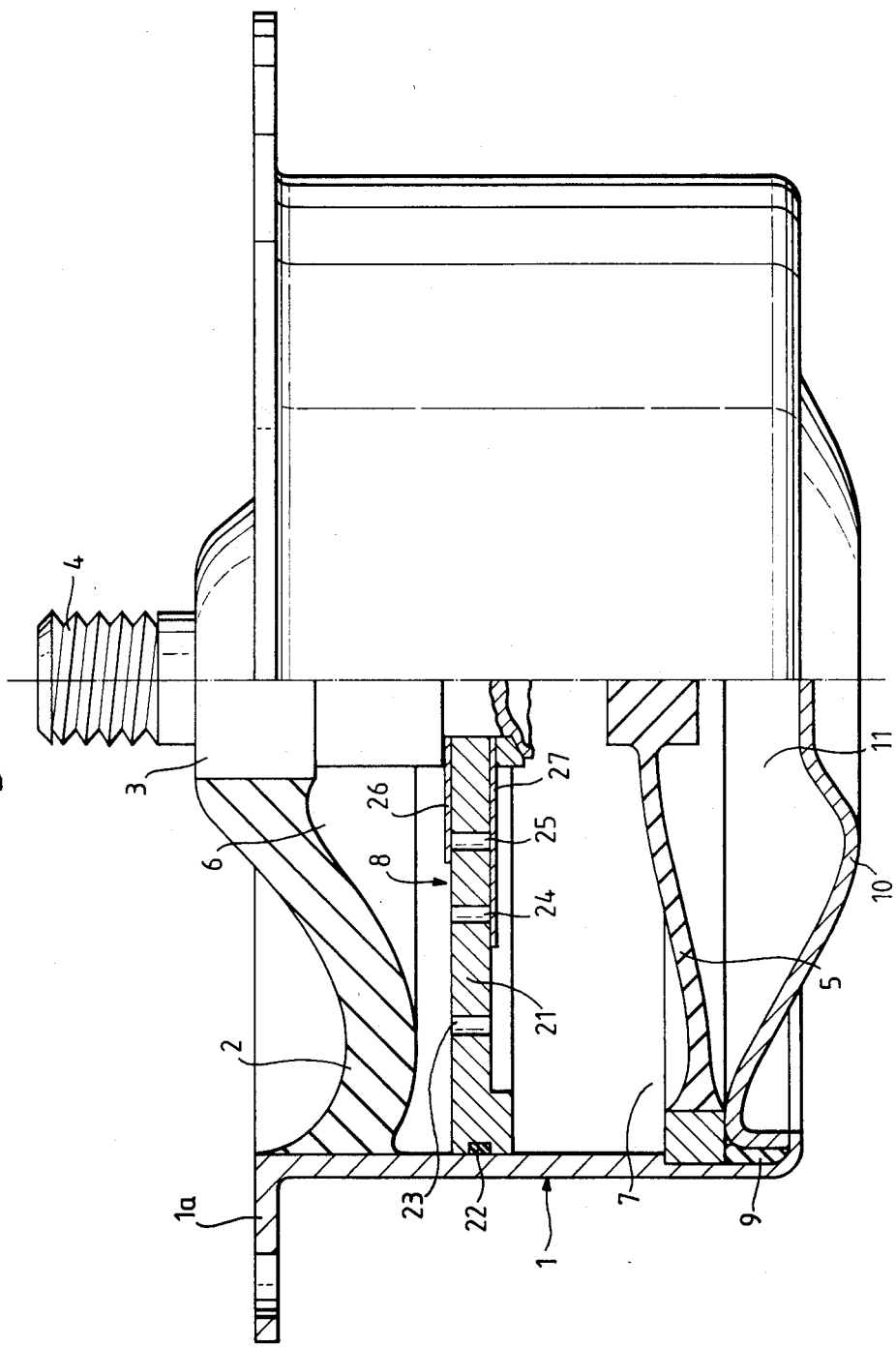

The embodiment illustrated in FIG. 2 differs from that of FIG. 1 by the fact that it is not provided with a metal armature 16, and by the fact that the dividing wall 8 is constituted by a metal disc 21 centrally fixed to the metal attachment element 3, and slidably mounted and sealed by means of a seal 22 within the first metal attachment element 1. The metal disc 21 has one or more calibrated holes 23 through which the viscous fluid can freely pass in any operating condition. There are also provided holes 24, 25 which allow the viscous fluid to pass freely only in the case of large amplitude displacements of the engine with respect to its supporting chassis. To this end, the metal disc 21 is provided on its two opposite faces with two resilient discs 26, 27 which are normally in contact with the corresponding face of the disc 21 and which become spaced from this face as a result of a large amplitude displacement of the metal attachment element 3. The resilient metal discs 26, 27 have different dimensions so that the damping effect is different according to whether the engine is displaced upwardly or downwardly with respect to its supporting chassis. The disc 27 is further provided with apertures to allow the passage of fluid through the holes 25 when the disc 26 is spaced from the disc 21.

Figure 3:
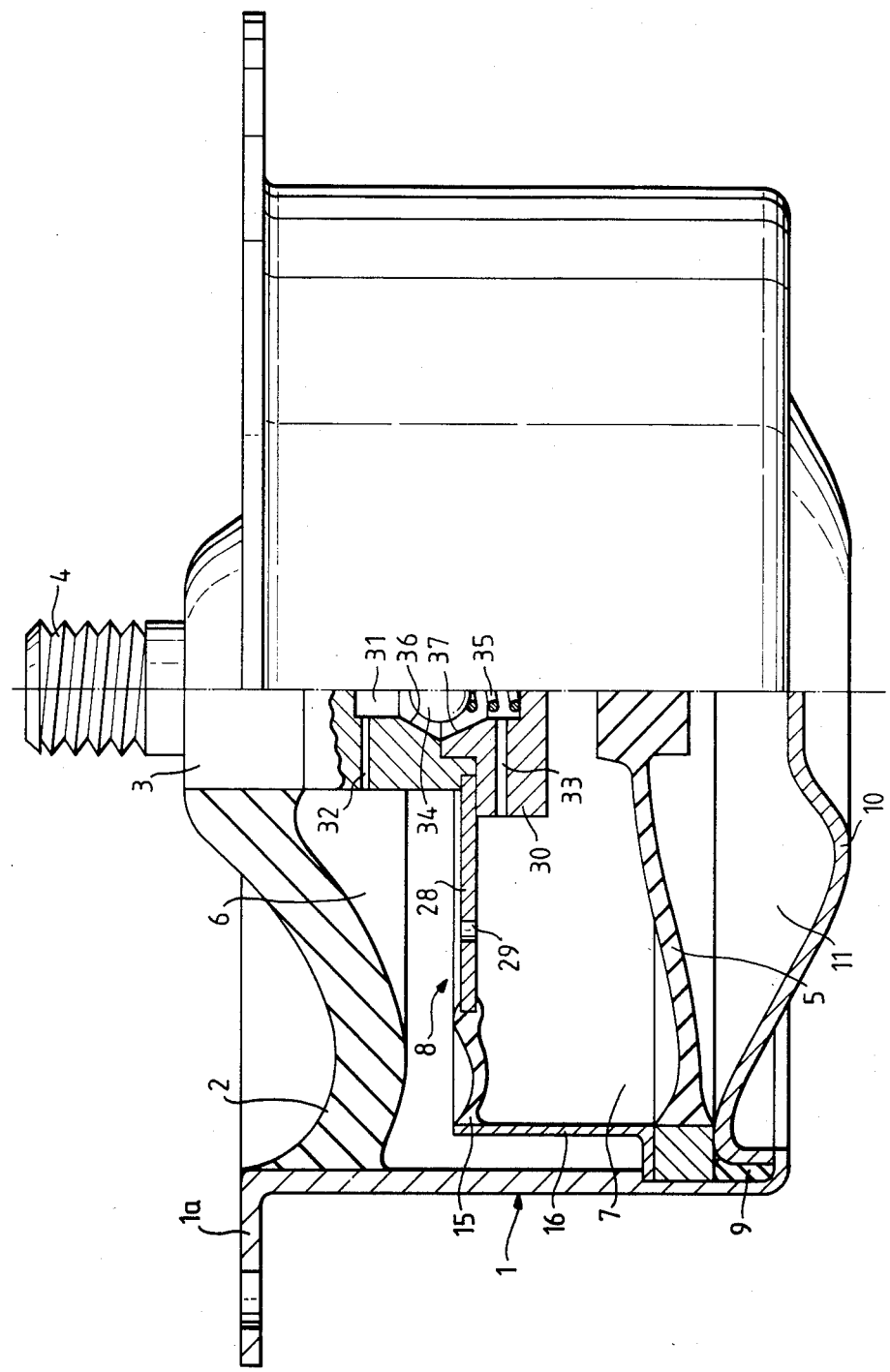

The embodiment illustrated in FIG. 3 differs from that of FIG. 1 by the fact that the dividing wall is constituted by a metal disc 28 fixed by means of the membrane 15 to the metal armature 16 and having one or more holes 29 through which the viscous fluid can freely pass upon displacements of the engine with respect to its supporting chassis. The metal element 3 is provided with a plug 30 which defines an internal cavity 31 communicating by means of ducts 32, 33 respectively with a variable volume chamber 6,7.

Within the cavity 31 there is disposed a ball valve 34 which rests under its own weight on a helical spring 35 resting on the bottom of the cavity 31. The ball valve 34 is intended to cooperate with two valve seats constituted by two conical surfaces 36, 37.

In the case of small displacements, the fluid can pass freely from the chamber 6 to the chamber 7, and vice versa, through the holes 29 and through the passage constituted by the cavity 31 and the ducts 32, 33. In the case of large amplitude displacements, the ball valve 34 interrupts communication between the two chambers through the cavity 31 so as to provide a limiting effect on the oscillation.

The embodiment illustrated in FIG. 4 differs from that of FIG. 1 by the fact that it is not provided with the metal armature 16, and by the fact that the dividing wall 8 comprises a slidably mounted metal ring 38 sealed by means of a seal 39 within the metal attachment element 1 and having its inner edge connected by means of a ring 40 of elastomeric material to a metal ring 45 fixed to the metal attachment element 3. In the central region of the metal ring 38 there are anchored, by means of two rolled collars 38a, two resilient metal rings 42 having the same function as the discs 17, 18 of FIG. 1 and cooperating with holes 43 in the metal ring 38.

The embodiment illustrated in FIG. 5 differs from that of FIG. 4 by the fact that the metal ring 41 is slidably mounted on the metal attachment element 3 and sealed by the interposition of a seal 44, whilst the outer peripheral edge of the disc 38 is fixed to a metal armatrue 16 of the type illustrated in FIG. 1.

Naturally, the principle of the invention remaining the same, the constructional details and the embodiments can be widely varied with respect to what has been described and illustrated purely by way of example, without thereby departing from the scope of the present invention.

I claim:
1. A shock-absorbing resilient support for the suspension of a body to a support structure, particularly for the suspension of motor vehicle engines, motor lorry cabs, and the like, such support comprising:
   a first metal attachment element (1) adapted to be fixed to the support structure;
   a second metal attachment element (3) adapted to be fixed to the body to be suspended on the support structure;
   a flexible body of elastomeric material (2) which connects the two metal elements (1, 3) together;
   a resilient membrane (5) carried by the said first attachment element (1), which delimits, together with the elastomeric body (2), a closed cavity filled with a viscous fluid;
   a dividing wall (8) within the said closed cavity which separates this cavity into first and second variable volume chambers (6, 7), this dividing wall (8) being provided with at least one passage for the transfer of viscous fluid from one chamber to the other upon relative displacements between the first and second attachment elements (1, 3); and wherein
   the said resilient membrane (5) delimits-on the side opposite the said cavity filled with viscous fluid-a third variable volume chamber (11) filled with gas under pressure and serving to support, at least in part, the weight of the suspended body,
   wherein each said passage includes valve means for varying the overall flow cross-section which puts the first and second chamber (6, 7) into communication with one another in the event of relative displacements of low frequency and large amplitude between the first and second metal attachment elements (1, 3).
2. A support according to claim 1, wherein
   said valve means are operable to reduce the overall flow cross-section which puts the first and second chamber (6, 7) into communication with one another, when the said low frequency, large amplitude relative displacements between the first and the second metal attachment elements (1, 3) occur.
3. A support according to claim 1, wherein
   said valve means are operable to provide different damping actions according to whether the suspended body is displaced upwards or downwards with respect to the support structure.
4. A support according to claim 2, wherein
   said dividing wall is fixed to the said second attachment element and is provided with two flexible discs (17, 18) disposed parallel to and a short distance from its two opposite faces and centrally fixed to the said second attachment element (3), these discs (17, 18) being operable to flex in the direction of the dividing wall (8) so as to obstruct corresponding holes for the passage of viscous fluid when large amplitude displacements of the suspended body with respect to the support structure occur.
5. A support according to claim 4, wherein
   the peripheral edge of the dividing wall (8) is connected by means of an annular resilient membrane

(15) to a tubular metal armature (16) disposed within the cavity filled with viscous fluid and fixed, in turn, to the first metal attachment element (1).

6. A support according to claim 1, wherein the gas-filled chamber (11) is delimited on the side opposite the resilient membrane (5) by a metal cover (10) fixed to the first attachment element (1).

7. A support according to claim 3, wherein the dividing wall (8) in constituted by a metal disc (21) fixed to the second metal attachment element (3), and slidably mounted and sealed in the first metal attachment element (1), the said metal disc (21) being provided on its two opposite faces with two flexible discs (26, 27) of different diameter centrally fixed to the second metal attachment element (3) and normally disposed in contact with the metal disc (21) so as to obstruct corresponding viscous fluid transfer holes (24, 25).

8. A support according to claim 2, wherein the said valve means are disposed within the said second metal attachment element.

9. A support according to claim 8, wherein the said valve means comprise a ball valve (34).

10. A support according to claim 2, wherein the dividing wall is constituted by an annular metal element (38) slidably mounted and sealed within the said first metal attachment element (1), and connected, by means of a ring (40) of resilient material, to the second metal attachment element (3), the said annular metal element (38) being provided on its two opposite faces with flexible discs (42) operable to obstruct corresponding viscous fluid transfer holes (43) when large amplitude displacements of the suspended body with respect to the support structure occur.

11. A support according to claim 2, wherein the dividing wall (8) is constituted by an annular metal element (38) having its outer peripheral edge fixed to a tubular metal armature (16) rigidly connected to the first metal attachment element (1) and disposed within the cavity filled with viscous fluid, and its inner peripheral edge connected by means of a ring (40) of elastomeric material to a metal ring (41) slidably mounted and sealed on the second metal attachment element (3).

* * * * *